(12) United States Patent
Forrester

(10) Patent No.: US 7,085,468 B2
(45) Date of Patent: Aug. 1, 2006

(54) SUPPORT FIXTURE AND METHOD FOR SUPPORTING SUBSCRIBER SPECIFIC FIBER OPTIC DROP WIRE

(76) Inventor: Joseph H. Forrester, 5073 Bristol Ind. Way #STEA, Buford, GA (US) 30518

( * ) Notice: Subject to any disclaimer, the term of this patent is extended or adjusted under 35 U.S.C. 154(b) by 0 days.

(21) Appl. No.: 11/316,185

(22) Filed: Dec. 22, 2005

(65) Prior Publication Data

US 2006/0098930 A1    May 11, 2006

Related U.S. Application Data

(63) Continuation-in-part of application No. 10/829,458, filed on Apr. 22, 2004.

(51) Int. Cl.
*G02B 6/00* (2006.01)
(52) U.S. Cl. ........................................ 385/135; 385/147
(58) Field of Classification Search ................ 385/135, 385/147
See application file for complete search history.

(56) References Cited

U.S. PATENT DOCUMENTS

| | | | | |
|---|---|---|---|---|
| 5,092,663 A | * | 3/1992 | Hivner | 385/100 |
| 5,867,624 A | * | 2/1999 | Forrester et al. | 385/134 |
| 6,215,937 B1 | * | 4/2001 | Dinh | 385/134 |
| 6,311,006 B1 | * | 10/2001 | Forrester et al. | 385/134 |
| D450,042 S | * | 11/2001 | Kaplan | D13/154 |
| 6,898,363 B1 | * | 5/2005 | Forrester et al. | 385/134 |

OTHER PUBLICATIONS

McCord, Kent. "Implications of the New Fiber Optic Bend Radius Standard in Cabling." Primedia Buisness Magazines & MEdia Inc. Oct. 1, 2000. http://ceenews.com/mag/electric_implications_new_fiberoptic/index.html.*

* cited by examiner

*Primary Examiner*—John D. Lee
*Assistant Examiner*—Rhonda S. Peace
(74) *Attorney, Agent, or Firm*—Shoemaker and Mattare

(57) ABSTRACT

Fiber optic drop wires extending from a cable closure supported along a fiber optic cable are supported by small horseshoe-shaped bend radius protectors which not only prevent overbending of the drop wires, but also enable one to store excess drop wire length on the bend radius protectors. The free end of the drop wire is clamped to a utility pole.

8 Claims, 2 Drawing Sheets

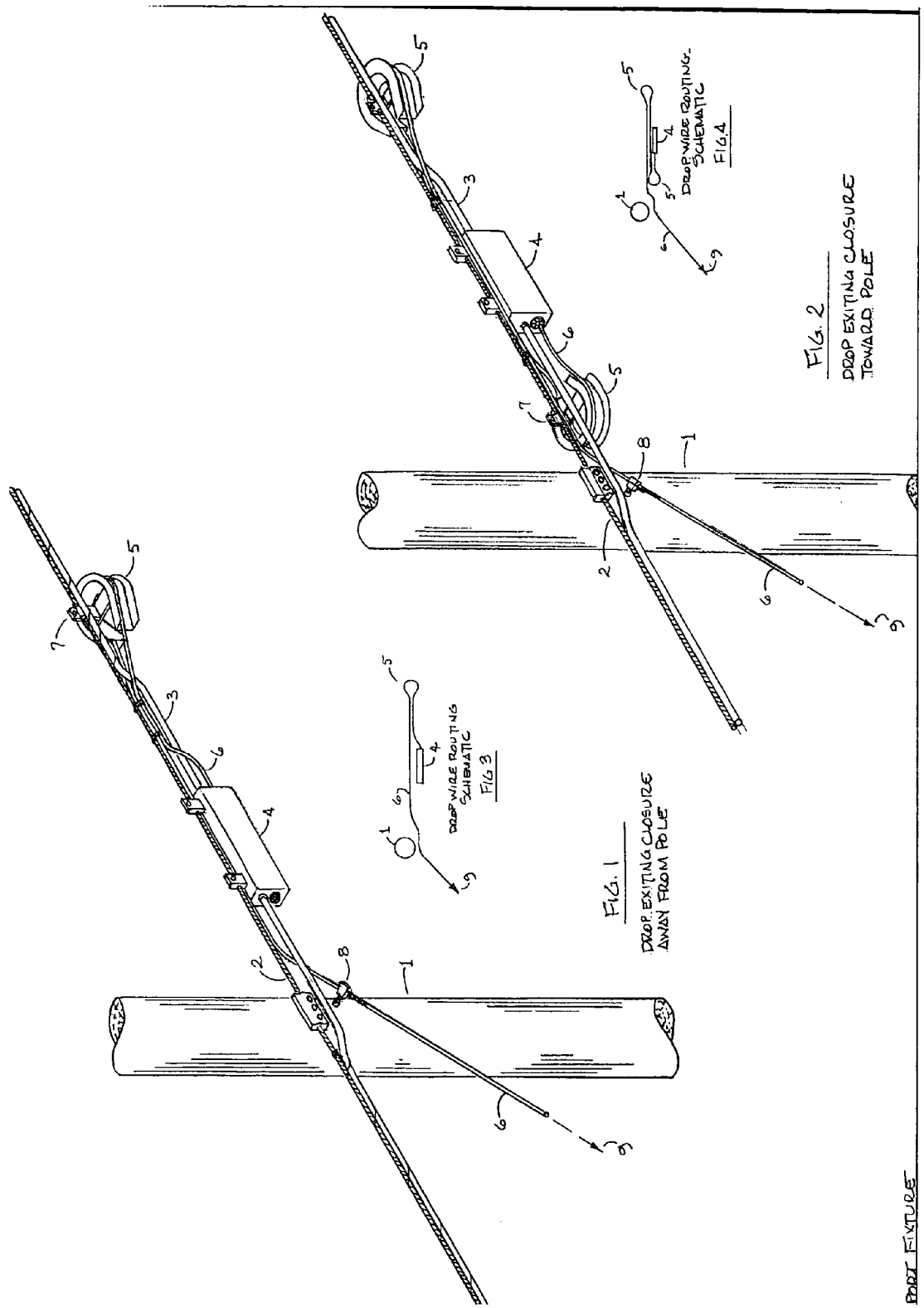

SUPPORT FIXTURE AND METHOD FOR SUPPORTING SUBSCRIBER SPECIFIC FIBER OPTIC DROP WIRE

This application is a continuation-in-part of copending application Ser. No. 10/829,458, filed Apr. 22, 2004.

BACKGROUND OF THE INVENTION

This invention relates to a support fixture and method for supporting subscriber specific fiber optic drop wire.

The invention relates generally to a method of aerially supporting lengths of fiber optic drop wire for subscriber applications, and more specifically, to an apparatus for supporting multiple lengths of fiber optic drop wire while maintaining a specified minimum bend radius.

Means for aerially supporting surplus lengths of fiber optic cable and apparatus designed to maintain a minimum specified bend radius for such cable are well known. However, prior devices specifically intended for fiber optic cable are not necessarily applicable to fiber optic drop wire, which has only recently been put into use.

While some of the of the requirements for installation of fiber optic drop wire are similar to that of fiber optic cable, some distinctly different requirements apply to fiber optic drop wire. Like fiber optical cable, fiber optic drop wire must be provided with means for supporting a surplus length of drop wire and protecting it against over-bending where the direction of the run must change. In the case of fiber optic cable, the surplus length of cable is contiguous with the main run, serving to provide for a surplus length alone. However, in the case of fiber optic drop wire, a surplus length of drop wire must be provided in conjunction with a separate independent run that is directed away from the main run of cable at some point in order to terminate at the subscriber location. The fiber optic drop wire originates from a closure or terminal located on the main cable run where, most often, multiple drop wires will also originate to be routed to various different subscriber locations.

Therefore, as opposed to similar apparatus and systems designed specifically for fiber optic cable, those for fiber optic drop wire must be capable of supporting numerous runs of drop wires on one fixture in a manner that is organized and provides an unobtrusive application while protecting against violating the minimum bend radius requirement of any given drop wire. Further, the system must provide for a means of neatly directing multiple runs in multiple directions.

Unlike support systems for fiber optic cable, where support fixture attachments are primarily associated with the main cable run, any apparatus for supporting fiber optic drop wires must be versatile and adaptable in a manner that will allow attachments to be made to adjacent runs as well as the run from which the drop originates, or to other locations. This provides flexibility in routing and also prevents the overload of any particular run.

Inasmuch as fiber optic drop wire is dimensionally different from the larger fiber optic cable, the dimensional requirements for support fixtures will differ from those designed for fiber optic cable as well. For the same reason, the system of storing surplus lengths of fiber optic drop wires with respect to lengths and occupied space will differ from that of fiber optic cable.

Additionally, because the connection of fiber optic drop wires to the main fiber optic cable can now be accomplished at the actual terminal or closure without having to remove the surplus length of the run, the requirements regarding length of surplus material for fiber optic drop wire will differ from those of the fiber optic cable, the length of surplus for the drop being only, as a rule, the amount required to accommodate a pole relocation or some other rerouting requirement. However, should the drop originate from a terminal or closure located within the surplus loop of the main fiber optic cable run, additional surplus drop length may be required, presenting additional need for versatility with respect to the apparatus' ability to accommodate multiple wraps as well as its ability to be attached at various locations.

The terms "fiber optic cable" and "fiber optic drop wire" as used in this application denote elements of greatly differing size. Fiber optic "cable" has a minimum of eighteen fibers, whereas fiber optic "drop wire" usually has only one or two fibers. Consequently, they are of substantially different diameters, and have correspondingly different minimum bend radii. Fiber optic cable bend radius protectors available today have bend diameters between ten and thirty inches (five to fifteen inch bend radius), whereas the fiber optic drop wire bend radius protectors have bend diameters not greater than six inches (three inch bend radius). Another important difference is that fiber optic drop wire is always self-supporting: it contains tensile elements like Kevlar strands, and thus does not need an external support such as a messenger cable. Fiber optic cable, on the other hand, may or may not have tensile elements, and may be supported by a messenger, as shown in the drawings. An example of a fiber optic drop wire is the "Mini DP Flat Drop Cable" made by Fitel USA Corp. It comprises two dielectric rods, one on either side of an extruded polymer tube in which two optical fibers are embedded. The rods and tube are covered by a DHPE jacket. It should be understood that this example is only for the purpose of illustration, and is not to be interpreted as a limitation to the claims that follow.

The present invention provides for apparatus and methods of application that are directed to the unique requirements of the installation of subscriber specific fiber optic drop wire.

According to the invention, a horseshoe-shaped device is used exclusively for the storage of and bend radius protection of "drop" wires (individual self-supporting that span from the pole to the house or premise) after leaving a multi port splice closure. These drop cables are very small self-supported cables with very low fiber counts as opposed to high fiber count transmission lines and are used almost exclusively for fiber to the house (FTTH) or fiber to the premise (FTTP) applications that are just now being developed.

Currently, fiber is reversed back to the pole from the splice closure and is "coiled" at the pole to provide a reserve length of fiber should the pole have to be moved or replaced. The reverse point of the fiber optic drop cables does not have the bend radius protected and the coils of the pole are time consuming and very unsightly since each splice closure can have as many as 16 separate drop cables exiting it. These units are designed for multiple wraps of the ADSS drop cables. The drop cable is very small and only needs a very small loop diameter (as compared to standard optical fiber cable).

SUMMARY OF THE INVENTION

An object of the invention is to simplify the routing of drop cables from a cable closure. Another object is to permit an installer to store excess drop cable in loops supported by bend radius protectors.

These and other objects are attained by a support fixture and method for supporting subscriber specific fiber optic drop wire.

While the requirements of having to mechanically control and protect the minimum bend radius while supporting an additional length along an aerial span is common to both fiber optic cable and fiber optic drop wire, there are additional requirements unique to the installation of fiber optic drop wire that do not present themselves in an installation of fiber optic cable. These unique requirements dictate that the apparatus use with fiber optic drop wire possess certain features that are not necessary in a fiber optic cable application.

Important features of the invention are discussed below.

The height of the support channel portion is such that a minimum of four individual wraps of drop wire may be accommodated. This is unique to drop wire installation in that, although the prior art of Forrester reveals the possibility of a need to accommodate multiple wraps of cable and provides a means of doing so, this would be a relatively infrequent application and further it would be highly impractical to apply as many as four, eight or more wraps of cable onto one support apparatus. By contrast, in the application of fiber optic drop wire, as many as four and possibly many more wraps are the norm. Providing an apparatus that allows for only one (or less than four) wraps of fiber optic drop wire would be highly impractical. Therefore, the present invention provides the unique feature of accommodating a minimum of four multiple wraps as dictated by the standards of application unique to a fiber optic drop wire installation.

The ends of the channel portion of the apparatus of the present invention are flared inward as well as upward and downward. Owing to the unique manner that fiber optic drop wire exits the terminal or closure in a multiplicity of structured and ordered positions, the angle of approach to the channel portion of a number of the drop wires would be such that an un-flared web or leg of the channel could present a condition of potential damage to the drop wire. This condition would not exist in a cable installation, even where multiple wraps were applied, due to the ability to maintain a more parallel attitude of approach based on the closer proximity of attachment to the main cable run. Therefore, the present invention provides the unique feature of flared channel ends as dictated by the unique requirements of the fiber optic drop wire application.

The drop wire retainer clip of the present invention is designed to retain a multiplicity of drop wires that the invention is designed to accommodate as well as the need to facilitate a unique characteristic of a fiber optic drop wire installation. Unlike a cable installation, where the cable is a one-time installation intended to accommodate a multitude of subscribers over a long span of time, the fiber optic drop wire is an addition to the initial cable installation that is installed only when a new subscriber location is identified and ordered for service. This means that any number of additional drop wires may be added to the existing aerial plant structure from time to time. While the aerial cable run is normally within the right-of-way of the road where the pole line is routinely cleared of tree branches and the like making the line proper less likely to be damaged during a storm, the drop wire installation must enter and span private property where the potential for damage is more likely and thus the potential for the need to access the wire-retaining area of the support bracket to replace a drop wire could be more frequent. In conventional cable installations, tie-wrap type devices have been used to secure the cable from dislodgement from the support bracket. Since the need to access or remove a cable from a support bracket is relatively rare, the tie-wrap represents a practical means for this particular use. In contrast, in the application of fiber optic drop wire, where the need to access the wire-retaining area of the support bracket will be relatively frequent, the use of tie-wraps to secure the wire-retaining area is impractical due to the fact that each incident of access requires cutting and discarding the existing tie-wraps and then re-installing new tie-wraps when the task is completed. Installation personnel, particularly those employed on a subcontract basis, cannot always be relied upon to replace tie-wraps that were removed thereby exposing the drop wires to potential damage. Therefore, there is a need to provide for a means to retain the drop wires within the channel portion of the apparatus which does not have to be removed during an installation or repair operation but, at the same time, allows for easy access to the wire-retaining area of the support bracket. The retainer clip of the present invention provides such a benefit. In use, the clip is installed into its respective indexing slot along the periphery of the channel portion of the support bracket. When access to the inner area of the channel is required, applying pressure to the protruding tab may open the clip, and then allowing the tab to spring back into place re-closes the accessed area. Thus the retainer clip remains in place throughout the operation and the drop wires remain properly secured at all times.

The recessed slot located in the cross-brace portion of the invention provides an indexing means by which either a standard messenger mounting bracket or an ADSS mounting bracket can be attached in a manner that prevents rotation of the support bracket in relation to the mounting bracket about the mounting bolt if or when pressure is applied to the channel as a result of the fiber optic drop wire installation process. Without such a securing means, the need to constantly realign the support bracket during the installation process would be a distinct possibility. A cable installation, by contrast, uses a support bracket with two mounting points in-line with the cable run from which it is suspended making rotation of the support bracket virtually impossible. With the fiber optic support bracket, the use of two mounting points would be impractical. Therefore, a means to arrest possible rotation is required and the means provided by the present invention addresses this requirement in the most practical manner.

The ADSS mounting bracket of the present invention is designed for use with a shortened version of the ADSS Cable Protection Sleeve presented in the prior art examples of Forester. The mounting bracket must be configured in a manner that allows the upper ends of the bracket legs to abut the lower radius of the cable protection sleeve in order to prevent the bracket from rotating about the bolt that is used to mount it to the cable protection sleeve. Otherwise, the entire assembly could essentially rock end to end in relation to the cable from which it is supported. In a cable installation, where two in-line mounting brackets are used, such a means to prevent a rocking motion is not required making this feature a unique requirement of a mounting bracket for a support apparatus for fiber optic drop wire in an ADSS application.

The support bracket, retaining clip(s) and mounting bracket may be constructed from a plastic-like material for use in an ADSS application making the assembly useable in the power supply zone if required. Otherwise, the support bracket may be constructed from aluminum with the retaining clip(s) being fabricated from spring steel or the like while the mounting bracket can be a standard messenger type mounting bracket where the installation is used in conjunction with messenger supported cable. Indexing dimples could replace the slots for indexing the retainer clips if the bracket were constructed from aluminum.

BRIEF DESCRIPTION OF THE DRAWINGS

In the accompanying drawings:

FIG. 1 is an isometric view of a support fixture and method for supporting subscriber specific fiber optic drop wire embodying the invention;

FIG. 2 is an isometric view of an alternative application;

FIG. 3 is a schematic view, from above, showing the fiber optic drop wire routing of the arrangement illustrated in FIG. 1;

FIG. 4 is a schematic view, from above, showing the fiber optic drop wire routing of the arrangement illustrated in FIG. 2.

DESCRIPTION OF THE PREFERRED EMBODIMENT

Figure 5:
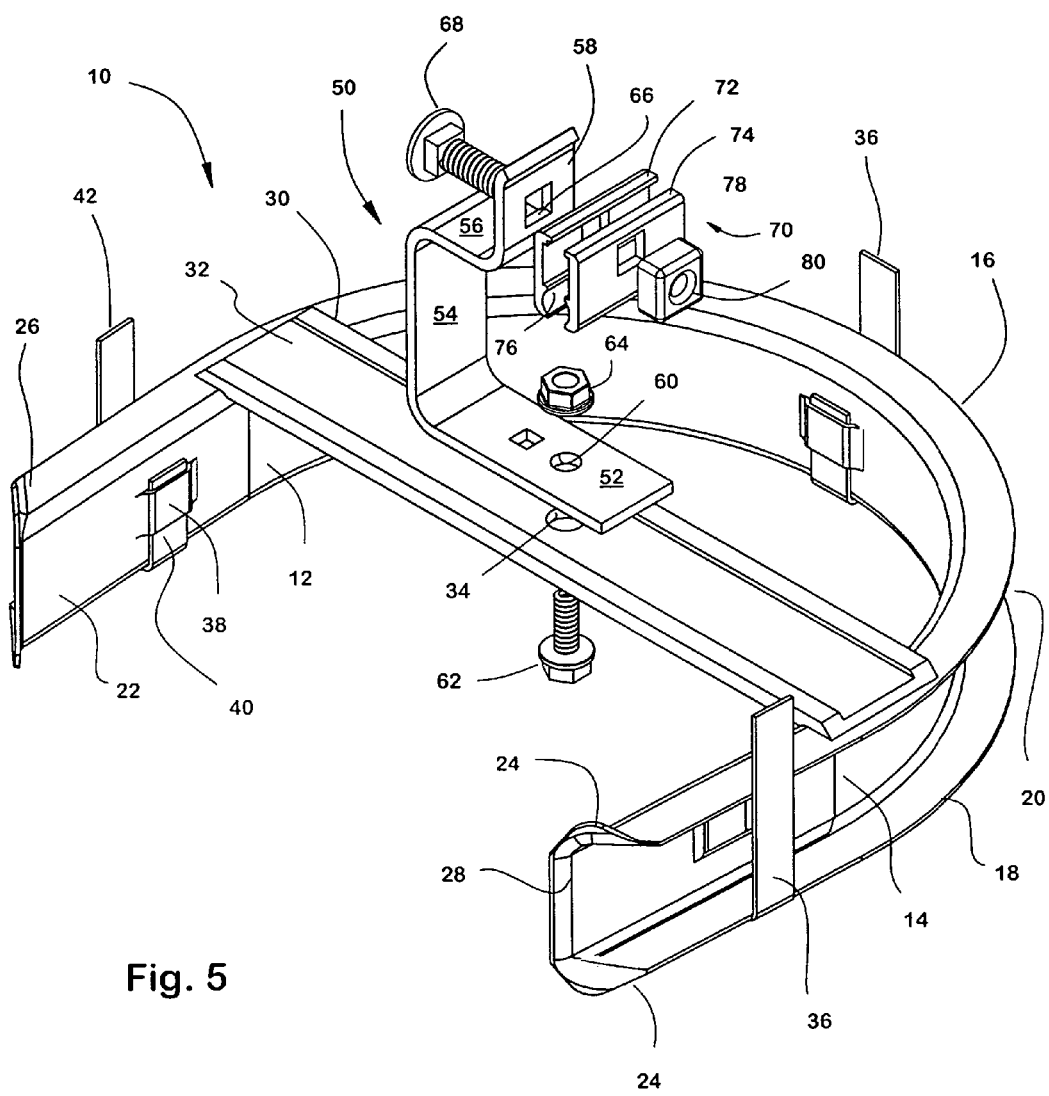
FIG. 5 is an isometric view, from above, showing the bend radius protector and suspending hardware in detail.

A fixture embodying the invention, shown in FIG. 1, includes a horseshoe-shaped bend radius protector 5 having two flanges defining an external channel for containing plural fiber optic drop wires. The protector 5 is suspended by a bracket 7 from a steel messenger cable 2 which is secured to a pole 1 by a clamp. A fiber optic cable 3 running along the messenger is secured to the messenger cable by wrapping. The cable closure 4 contains optical connectors which pass signal from the main cable to one or more drop wires 6. In most cases, three to sixteen drop wires extend from each cable closure; however, only one is shown in the drawing for the sake of clarity. The external channel of each bend radius protector is large enough to support from three to sixteen drop wires.

The cable closure has two ends: one near the pole and one further away. In the arrangement of FIG. 1, a drop wire extends from the further end in a direction away from the pole. It is tied to the messenger cable, and then proceeds around the bend radius protector 5 and back along the messenger, past the closure, and through a wedge-type drop wire clamp 8 secured to the pole. The clamp applies pressure to the tensile strands of the drop wire, which are larger than the fibers between them and therefore protect the fibers from damage.

In the alternative arrangement of FIG. 2, two bend radius protectors are installed, one on either side of the cable closure. The drop wire extending from the near end of the closure is passed around the proximal protector, then run along the messenger, around the distal protector, and back through the drop wire clamp 8. With this arrangement, more than one loop of each drop wire can be run around the protectors, if desired, to provide flexibility in case the drop wire should have to be rerouted later.

In practice, many drop wires will extend from a single closure, en route to different homes or locations. For this reason, each bend radius protector should have a flange depth and a distance between flanges sufficient to accommodate up to sixteen drop wires at once.

While the arrangements shown in the drawings have the bend radius protectors and the cable connection closures suspended from the cable messenger, other arrangements are possible. For example, the bend radius protector (or one bend radius protector, where more than one are used) may be attached directly to a pole, or may be suspended directly from the optical cable, where self-supporting cable is used.

FIG. 5 shows a bend radius protector 10 in detail. It comprises a thin-gauge metal or plastic channel 12 having a central web 14 and upper and lower flanges 16, 18 defining an open groove 20. The channel is bent into a horseshoe shape, with the groove facing outward. The ends 22 of the horseshoe are nearly parallel, converging by a few degrees. To prevent the ends of the channel from cutting or abrading the drop wire sheath, both arms of the horseshoe are flared by bending the corners 24 of the upper and lower flanges, at generous bend radii, away from one another, until they are substantially coplanar. The bend lines 26 extend at an angle of about 45° to the length of each arm. Each end 28 of the central web is also bent away, that is, toward its opposite counterpart, at an angle of about 45°, likewise to prevent drop wire damage.

A cross-brace 30 is attached as by welding, or formed integrally with, if the brace is plastic, across the top flange, at or near the geometric center of the brace in plan view. The brace prevents the arms of the horseshoe from spreading, and provides means by which the bend radius protector may be suspended from a wire, cable or pole. It has a broad shallow channel 32 running lengthwise in its upper surface to prevent rotation of the suspension bracket described below. A hole 34 is formed at the center of the cross-brace.

J-shaped retaining clips 36 are inserted into pockets 38 formed at three equally spaced locations around the horseshoe. Each pocket is produced by punching a segment of the center web of the horseshoe inward toward the center of the horseshoe. The short leg 40 of the "J" is inserted into the pocket, while the long leg 42 engages the periphery of the upper and lower flanges, preventing drop wires within the groove from escaping. The clip may be dimpled (not shown) to provide a snap-action.

The drawing shows a suspension bracket 50 designed to suspend the protector from an optical cable. The bracket includes a lower horizontal segment 52, an adjoining intermediate vertical segment 54, an upper horizontal segment 56, and a top vertical segment 58. The lower horizontal segment has a hole 60 at its center through which a bolt 62 is inserted to secure the bracket to the brace. A nut 64 is threaded onto the end of the bolt once the parts have been positioned. The top vertical segment of the bracket also has a hole, preferably a square hole 66, through which a carriage bolt 68 is inserted. A cable clamp 70, comprising major and minor halves 72, 74 each having a concave longitudinal channel 76 for receiving the cable and a transverse hole 78 for the carriage bolt, is installed over the threaded end of the carriage bolt. The clamp grasps the cable over a substantial length thereof, to prevent the bend radius protector from pitching forward or rearward with respect to the cable. Once the cable is situated between the clamp halves, a nut 80 is threaded onto the bolt and tightened to squeeze the cable between the clamp halves.

When the parts are assembled and tightened, the bend radius protector is securely suspended from the cable; however, it can easily be moved, when necessary, by loosening the clamp.

Since the invention is subject to modifications and variations, it is intended that the foregoing description and the accompanying drawings shall be interpreted as only illustrative of the invention defined by the following claims.

I claim:

1. A fixture for supporting subscriber specific fiber optic drop wire extending from a cable closure containing a connection between the fiber optic drop wire and a fiber optic cable supported by utility poles, said fixture comprising a bend radius protector having a grooved periphery of a radius at least as great as the minimum drop wire bend radius but less than the fiber optic cable bend radius, and means for suspending the bend radius protector from the cable, a cable support messenger or a pole wherein the bend radius protector comprises a channel formed in the shape of a horseshoe, the channel having a central web an upper and lower flanges defining a groove facing outward, the horseshoe having ends which are flared outward to prevent the bend radius protector from cutting or abrading the drop wire, wherein the flared ends are produced by bending corners of the flanges away from one another about 90° along bend lines extending at about 45° to the length of the ends.

2. The fixture of claim 1, wherein the center web of the channel is bent inward, towards its opposite counterpart, about 45° to prevent the bend radius protector from cutting or abrading the drop wire.

3. The fixture of claim 1, further comprising
a suspension bracket,
means for attaching the bracket to the bend radius protector,
a clamp having means for gasping a wire or cable, and
means for connecting the clamp to the bracket,
whereby the bend radius protector may be secured to the wire or cable.

4. The fixture of claim 3, wherein the bend radius protector has a cross-brace, the cross-brace having a channel sized to receive a segment of the bracket and to prevent the bracket from rotating with respect to the bend radius protector.

5. The fixture of claim 3, wherein the clamp grasps the cable over a substantial length thereof, to prevent the bend radius protector from pitching forward or rearward with respect to the cable.

6. A fixture for supporting subscriber specific fiber optic drop wire extending from a cable closure containing a connection between the fiber optic drop wire and a fiber optic cable supported by utility poles, said fixture comprising a bend radius protector having a grooved periphery of a radius at least as great as the minimum drop wire bend radius but less than the fiber optic cable bend radius, and means for suspending the bend radius protector from the cable, a cable support messenger or a pole wherein the bend radius protector comprises a channel formed in the shape of a horseshoe, the channel having a central web and upper and lower flanges defining a groove facing outward, the horseshoe having ends which are flared outward to prevent the bend radius protector from cutting or abrading the drop wire, wherein pockets are formed at plural locations around the horseshoe, each said pocket being sized to receive one end of a drop wire retaining clip.

7. The fixture of claim 6, wherein the pocket and/or the retaining clip is dimpled to provide a snap action assembly.

8. The fixture of claim 6, in combination with plural drop wire retaining clips, each having an end adapted to be inserted into and retained by one of said pockets, and each having a portion which extends from one peripheral flange to the other to retain one or more drop wires in the groove.

* * * * *